Dec. 4, 1934.    R. E. SMITH    1,983,051
HYDRAULIC POWER DUMPING MECHANISM
Filed June 15, 1931    7 Sheets-Sheet 1
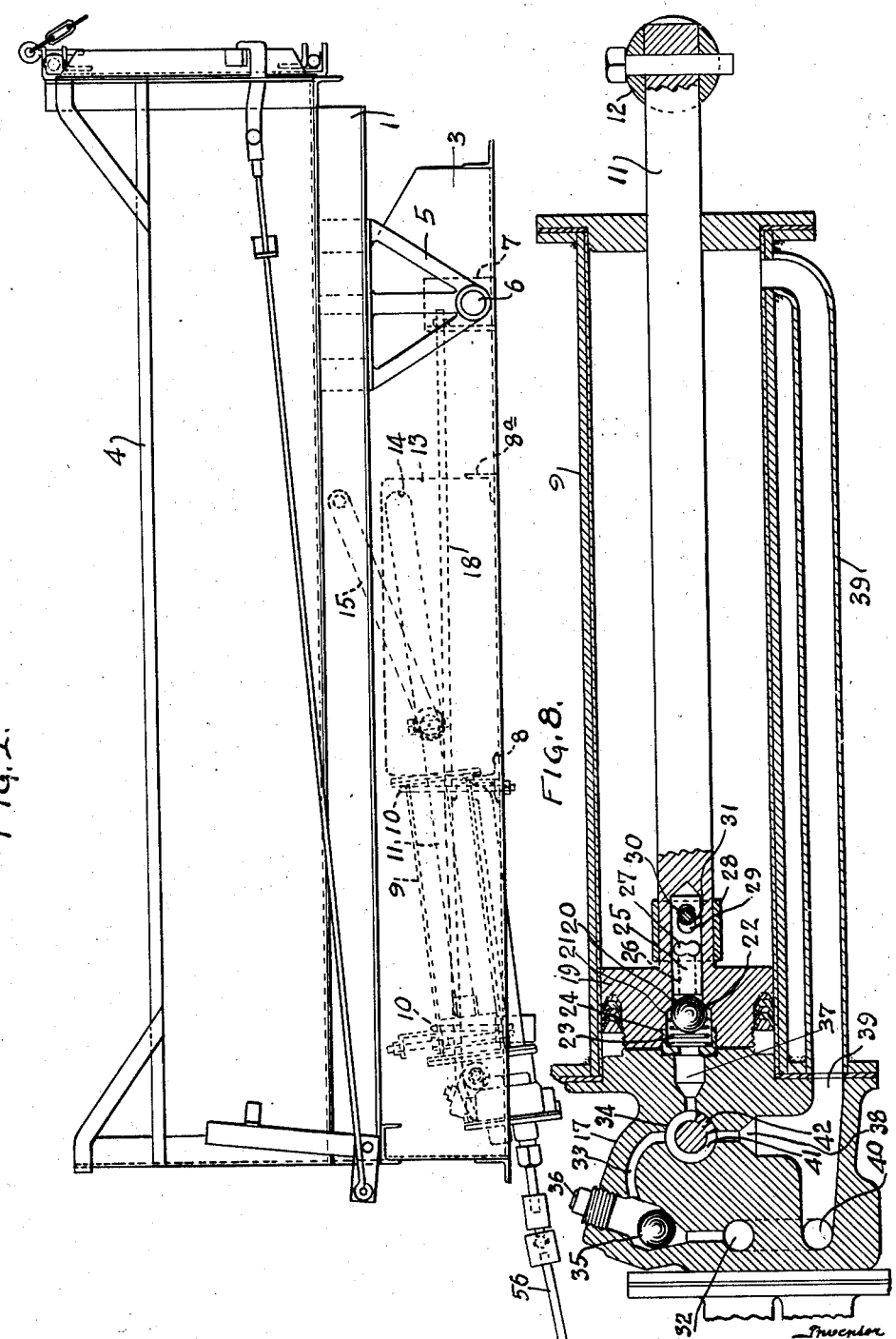

Dec. 4, 1934.                R. E. SMITH                1,983,051
                    HYDRAULIC POWER DUMPING MECHANISM
                    Filed June 15, 1931        7 Sheets-Sheet 2
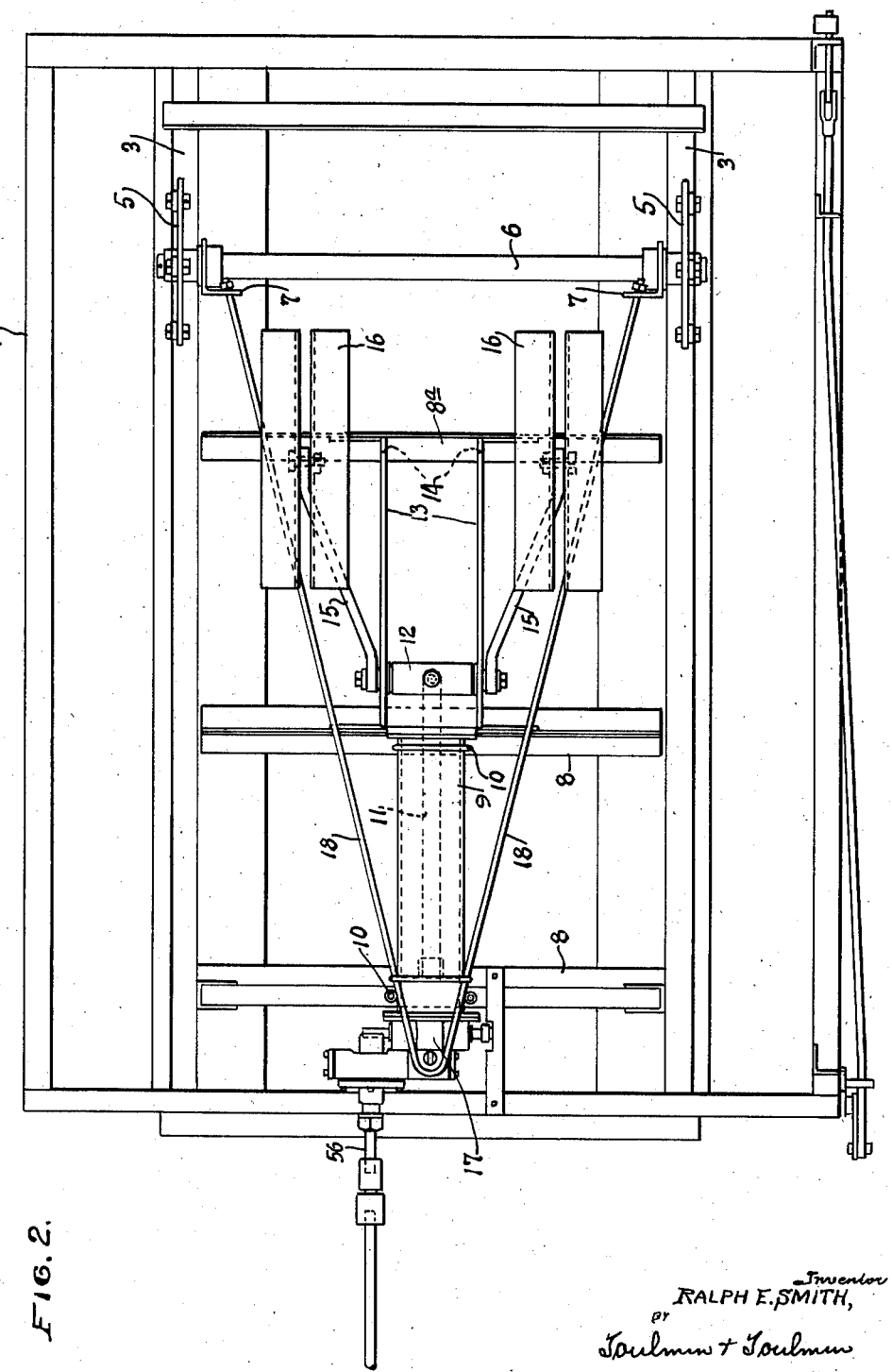

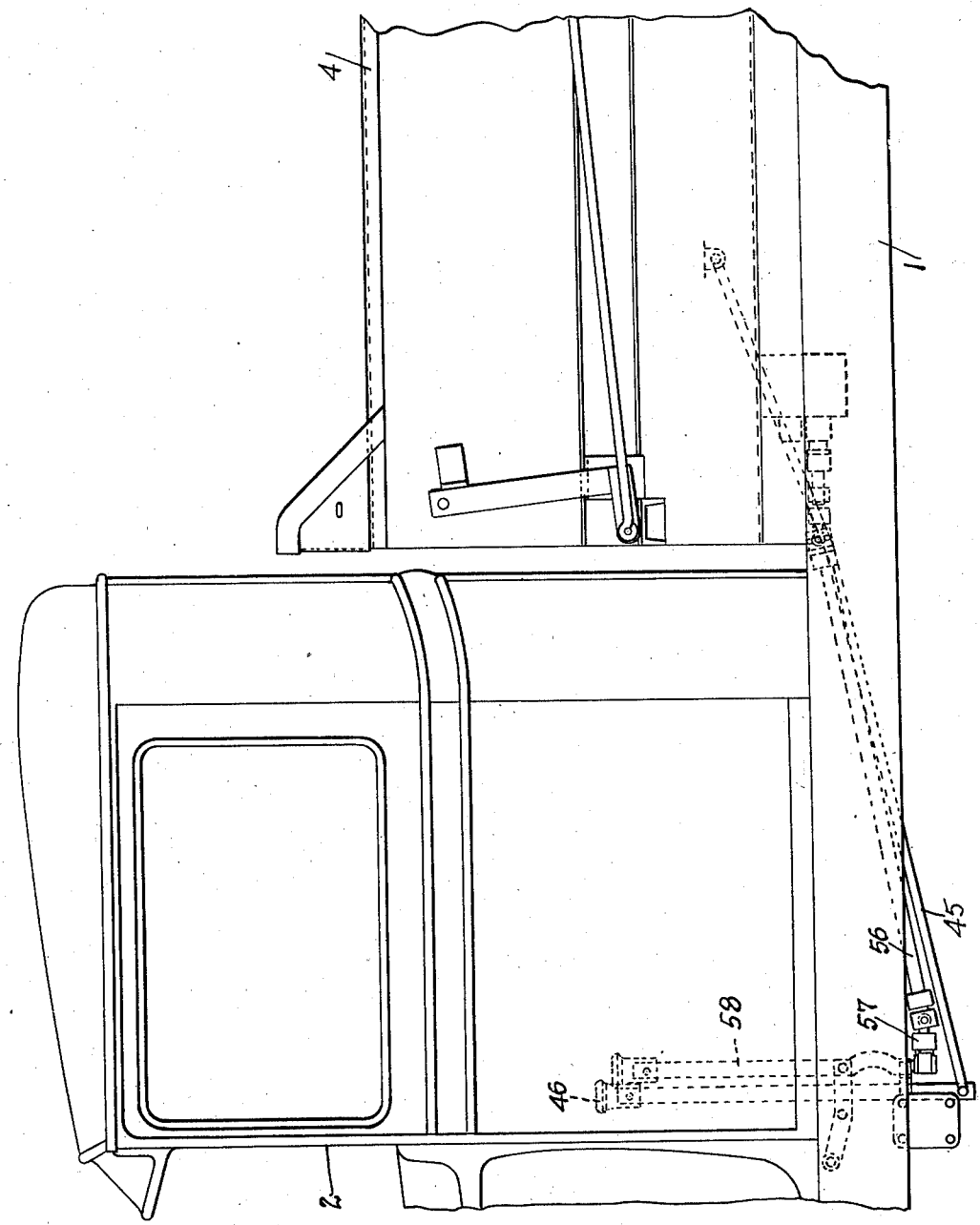

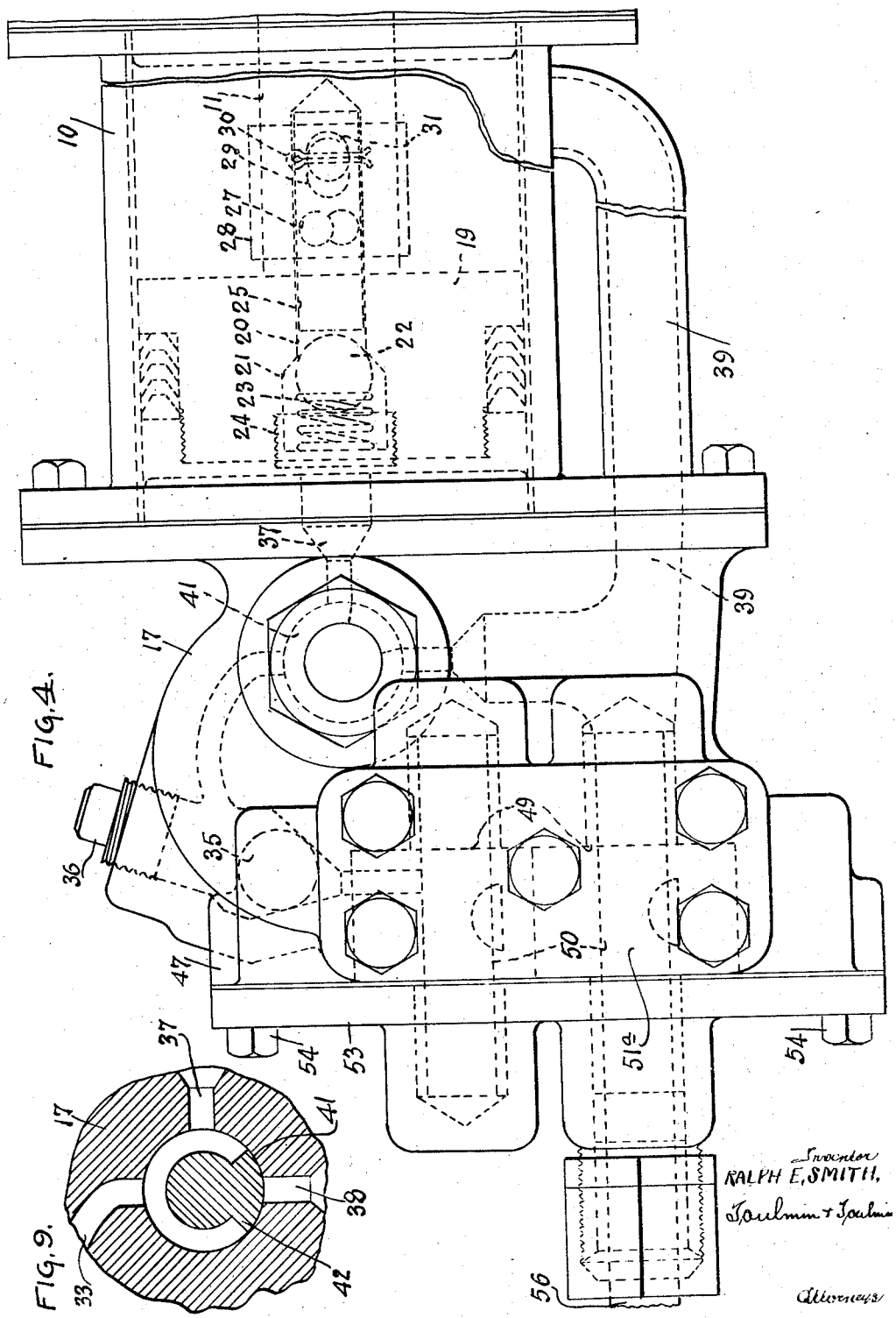

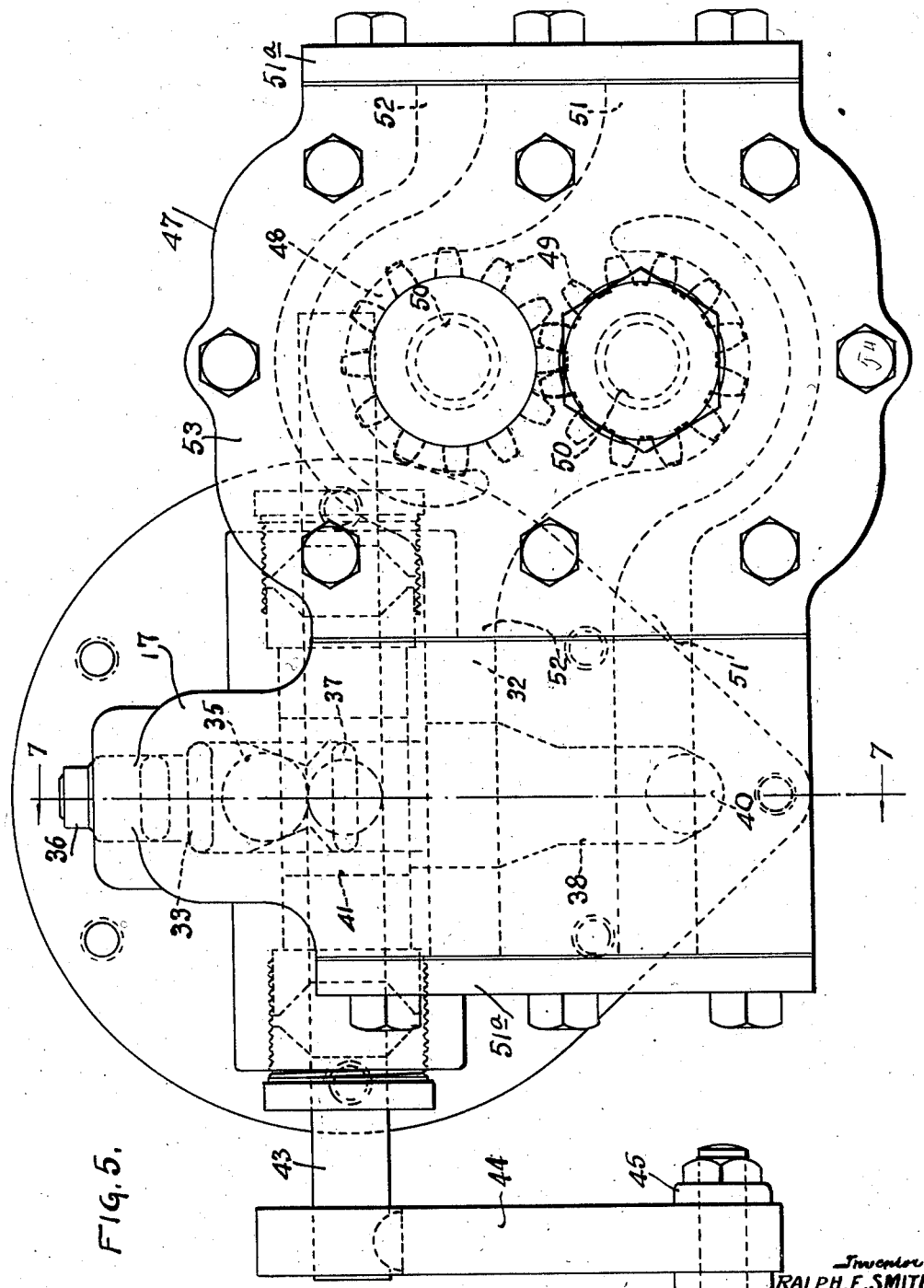

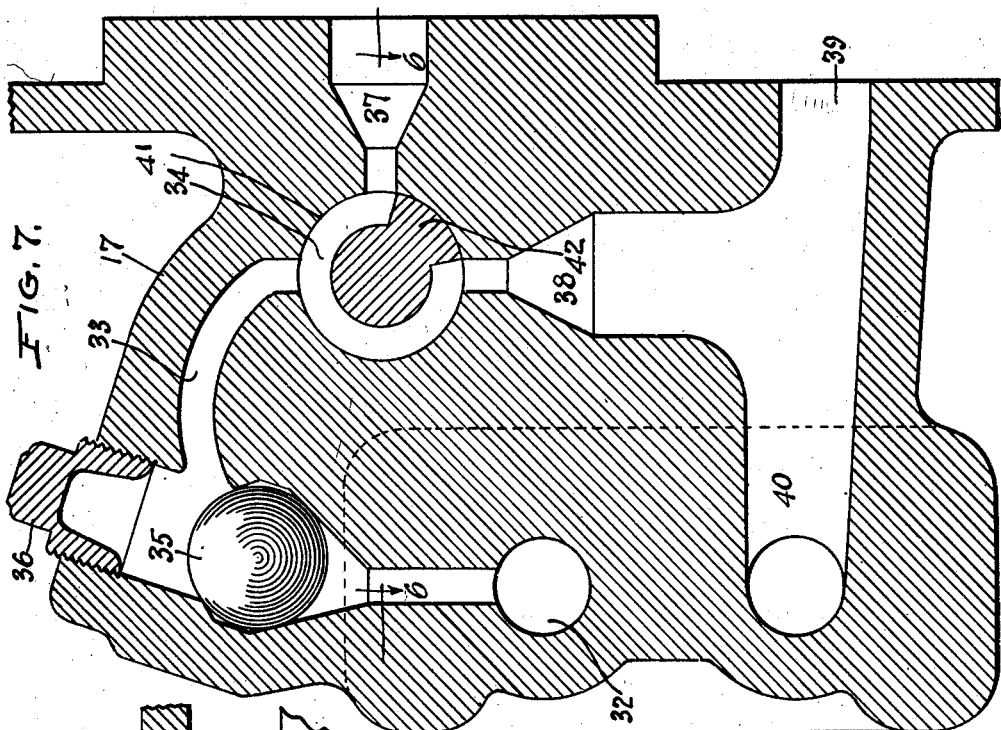
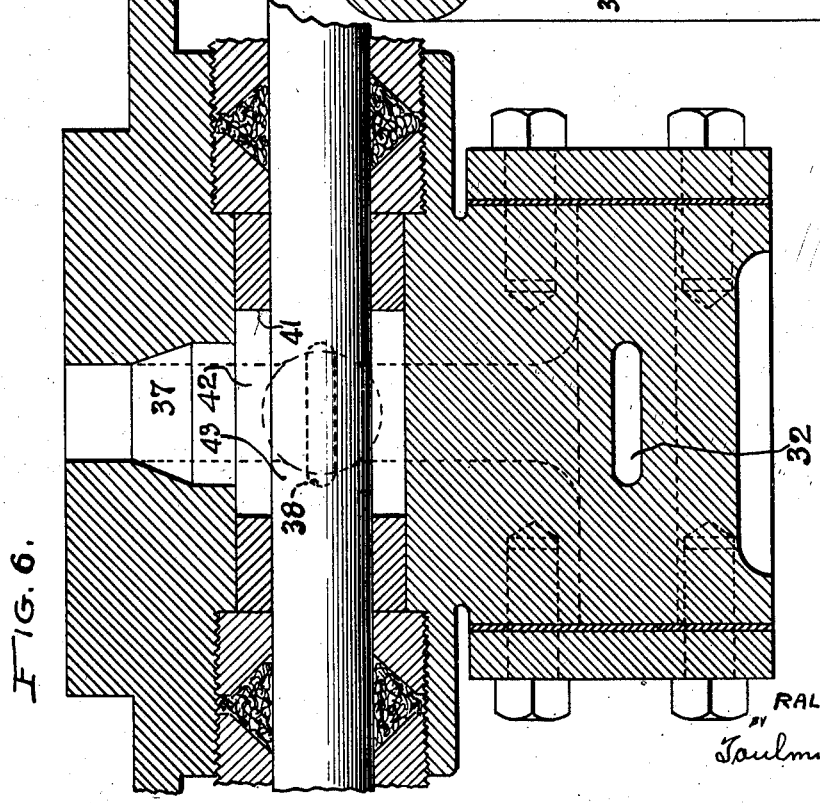

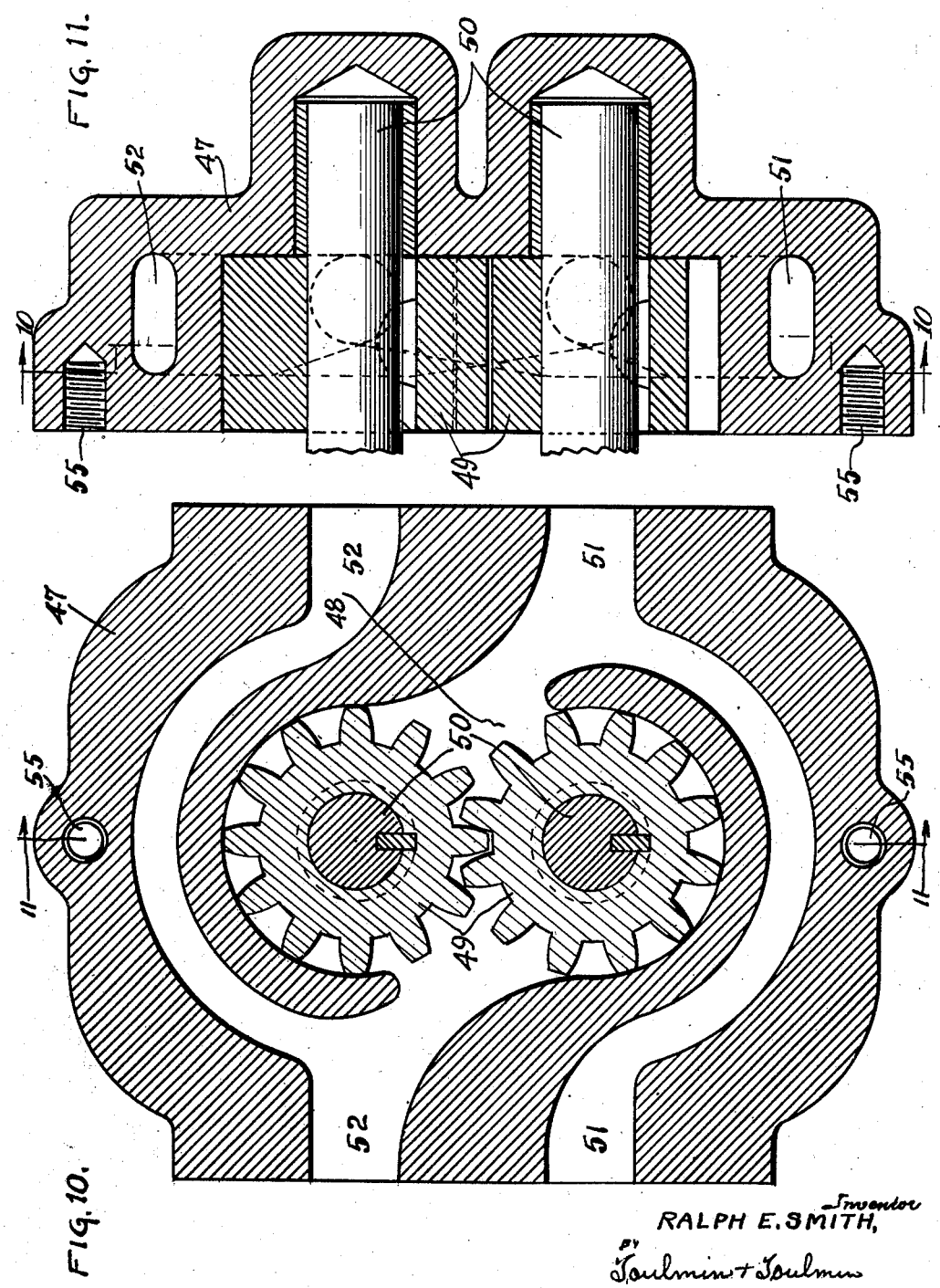

Patented Dec. 4, 1934

1,983,051

UNITED STATES PATENT OFFICE

1,983,051

HYDRAULIC POWER DUMPING MECHANISM

Ralph E. Smith, Galion, Ohio, assignor to The Galion Metallic Vault Co., Galion, Ohio, a corporation of Ohio Application June 15, 1931, Serial No. 544,503

6 Claims. (Cl. 298—22)

This invention relates to improvements in mechanism for operating dump bodies on trucks, and has for its object to provide hydraulic means by which the body of a truck may be dumped, held in dumping position, and released therefrom after the material has been dumped from the body.

It is also an object of this invention to provide a hydraulic operating means for dumping the body of a truck, and provide means within the cab of the driver of the truck whereby a pump may be operated for applying pressure, and also a valve may be operated for relieving the pressure and directing the pressure.

It is also an object of this invention to provide means in connection with the hydraulically operated cylinder and piston therein to relieve the pressure from behind the piston after the piston has reached the full extent of its operative movement. This pressure is relieved without destroying the holding pressure behind the piston.

It is also an object of the invention to prevent the sudden descent of the piston and piston rod and body in the event the oil pressure is cut off.

It is also an object of this invention to provide a hydraulic pump and cylinder mechanism for dump bodies in which there is no pipe connection between the pump and the cylinder.

These and other advantages will appear from the following description taken in connection with the drawings.

Referring to the drawings:

Figure 1 is a side elevation of the sub-frame and the dump body supported thereby, with the operating mechanism shown in dotted lines.

Figure 2 is a top plan view of the frame with the body removed.

Figure 3 is a side elevation of the front of the truck.

Figure 4 is a side elevation of the pump mechanism showing one end of the cylinder and the valve therein in dotted lines.

Figure 5 is a front elevation of the pump mechanism and the operating valve.

Figure 6 is a section on the line 6—6 of Figure 7.

Figure 7 is a section on the line 7—7 of Figure 5.

Figure 8 is a longitudinal vertical section through the cylinder and the valve and pump head attached thereto.

Figure 9 is an enlarged sectional view showing the valve and the different outlets and inlets to the valve.

Figure 10 is a section on the line 10—10 of Figure 11.

Figure 11 is a section on the line 11—11 of Figure 10.

In the drawings there is shown just sufficient amount of the truck to illustrate the present invention and show its connection with the vehicle to which it is applied.

The numeral 1 is used to designate the truck frame which has at the front end thereof the driver's cab 2. On this frame is a sub-frame 3 that directly supports the body 4. Extending downwardly from each side of the body, near the rear end thereof, is a bracket 5. The lower ends of these brackets have holes therein to receive a shaft or rod 6 extending through the lower edges of the sides of the sub-frame 3.

Adjacent each end of the rod 6 and attached to the side of the sub-frame is a bracket 7 used to support the ends of a brace rod, later to be described. Near the front end of the sub-frame and attached to the sides thereof are two cross beams 8, to which a cylinder 9 is attached. The cross beam adjacent the front end of the frame supports the front end of the cylinder beneath it, while the beam 8 more remote from the front end of the frame supports the rear end of the cylinder above the beam.

In order to thus support the cylinder the beam near the front end is located approximately at the upper edges of the sides of the sub-frame, while the beam 8 near the rear end of the frame is located near the lower edges of the sides of the frame, and upon this beam the rear end of the cylinder rests. The cylinder is attached to these beams by means of U-bolts 10. These U-bolts pass around the cylinder and through the beams and have on their free ends nuts by which the cylinder is held to the beams.

In this cylinder is a piston rod 11, which has attached to its outer end a cross head 12. In order to support and guide the cross head during the movement of the piston rod there are provided two plates 13, suitably attached to one of the beams 8, and another beam 8a similar thereto located near the rear of the frame along the lower edges of the sides of the sub-frame. In these plates are slots 14, one in each plate, in which the ends of the cross head travel during the movement of the piston within the cylinder. Attached to each end of the cross head is a link 15, the other end of which is attached to plates 16 located on the under side of the body of the truck.

It will be observed from an examination of Figure 1 that the slots 14 are in line with the line of travel of the piston and the cross head so that there is, at no time, any pinching or binding between the head and the parts of the piston and piston rod contacting with the head. It will also be observed from Figure 1 that the upwardly-inclined arrangement of the cylinder 9 and guide slots 14 afforded by this construction, results in a greatly-increased torque applied to the dump body around its pivots 6, thus enabling the load to be lifted more easily at the start of the dumping operation. At the same time, the cylinder 9 is located substantially within the confines of the relatively-deep sub-frame 3, thereby affording an increased protection to its mechanism. Remote from the end of the cylinder through which the piston rod passes there is a valve head 17, constituting one end of the cylinder. This head is held in position on the cylinder by means of suitable bolts, and it is also braced by means of a brace 18 extending around a suitable part of the head and attached at each end to a bracket 7.

Within the cylinder and attached to the piston rod 11 is a piston 19, which has in one face thereof a hole 20. This hole extends back into the end of the piston rod adjacent the piston, the two being formed integral. The part of the hole remote from the piston rod is somewhat enlarged, as indicated by the numeral 21, to provide space and a seat for a ball 22 and a spring 23 for holding the ball seated against the more restricted part of the hole 20. In order to hold the spring in proper position against the ball there is provided a ring lug 24 which is threaded into the outer end of the hole 20.

Located in the reduced part of the hole 20 is a plunger 25, which has a suitable passageway 26 leading from the ball end of the plunger to a port 27 which extends through the piston rod and also through a sleeve 28 located on the piston rod adjacent the piston. The holes in the sleeve and the piston rod are in alignment with each other when the sleeve is in a certain position on the piston rod, but since this sleeve may be moved slightly on the rod these holes may be closed by means of the sleeve moving along the rod.

In order to hold the sleeve on the piston rod but allow a certain amount of movement thereon there is provided in the sleeve a hole 29 through which a pin 30 passes, and through a slot 31 in the piston rod 11. In order to accommodate this pin there is also provided in the plunger 25 a hole through which the pin passes.

As the piston and piston rod advance toward the rear end of the cylinder, due to pressure behind the piston, the sleeve will contact with the rear end of the cylinder. The sleeve thus contacting with the rear end of the cylinder will cause the sleeve to move toward the piston, thereby opening the ports or passageways 27 so that the oil may pass through and around the valve, through the ports 27 into the cylinder toward the rear of the piston. By this means, though the pump continue its operation, no strain or stress is produced, there being merely a recirculation of the oil, the oil passing through the piston from one end to the other, back through a passageway 39, and back to the pump.

In the valve head 17 there is a passageway 32 which leads from the pump used for the purpose of supplying oil pressure to the piston. From this passageway there extends a passageway 33 through the valve cylinder 34. There is also provided in this passageway a check valve 35 to prevent the backward flow of the oil toward the pump. This is a ball valve and easily and effectively seats itself and keeps the seat clean by constant rotation, and constantly assuming different positions on the seat. Thus this ball valve will prevent the sudden descent of the piston and piston rod and body in the event the oil pressure is cut off.

The part of the casing adjacent the check valve is open and provided with a closure plug 36 through which the ball may be removed or replaced. Extending from the valve cylinder is a return passageway 38, which leads to a passageway 40, leading back to the pump. The pump will take in the oil from the pump intake 40 and discharge the oil from the pump outlet 32.

In order to control the passage of oil through the passageway 33 there is provided in the valve cylinder 34 a rotary valve 41, which has thereon a closure part 42. This valve may be rotated so that the part 42 may close the return passageway 38. It may close the passageway 37 to the cylinder 9, or it may close the passageway 33 leading from the pump. The position of the valve depends upon the direction to which the oil is to be forced. On this rotary valve is a valve stem 43, which has attached thereto a lever 44 for operating the valve shaft in its different positions. There is also attached to the lever 44 one end of a link or rod 45, the other end of which is attached to a valve operating lever 46 located in the cab.

For the purpose of supplying oil under pressure to the cylinder there is provided a pump, such as shown in Figure 5. In the present instance this is a rotary pump and has a pump casing 47, in which there is a pump chamber 48. In this pump chamber are two pump gears 49 intermeshing with each other and closely engaging the walls of the pump chamber. These intermeshing gears are operated by shafts 50.

This pump mechanism is constructed so that it may be adjustably located with relation to the valve mechanism. Each side of the pump case has an inlet 51 and an outlet 52. These outlets and inlets have the same relative position with relation to each other on each side of the pump casing so that the casing may be located with either side in engagement with the valve mechanism, and in order to close the inlet or outlet not in use a plate 51a is suitably attached to the casing so that one inlet and one outlet are closed. A similar plate 51a fits on the side of the valve head to which the pump casing is not attached. The other inlet and outlet are connected to the valve mechanism so that the inlet from the pump will receive the oil from the part 40 and will discharge it through the outlet into the passageway 32 for distribution to the valve mechanism and to and from the cylinder. The valve head structure affords a support for the pump case and a connection between the pump and the cylinder in which there are no pipes.

In order to close one side of the casing and provide a complete inclosure for the pumping mechanism there is provided a cover plate 53 attached to the main body of the casing by means of screws 54 threaded into sockets 55 in the pump casing 47. One of the shafts 50 terminates in a drive shaft 56, which is connected to power take-off gears 57 connected to the power that propels the truck. This power take-off mechanism is operated by means of a lever 58 located in the cab of the truck.

When it is desired to elevate the body for dumping purposes the lever 58 is operated to throw the power take-off gears in mesh with the power of the truck. This causes the pump to operate. After the pump is suitably operating the lever 46 is operated to properly position the valve 41.

With the valve in proper position the oil is forced from the pump through the valve into the cylinder, thereby forcing the head of the piston from the front of the cylinder toward the rear, raising and dumping the body. When the piston has been projected substantially its full length from the cylinder the sleeve around the piston rod will contact with the rear end of the cylinder, thereby opening the passageway through the piston rod and the sleeve so that the oil will pass around the valve into the cylinder, back of the piston.

This contact or striking of the end of the cylinder by the sleeve will move the plunger 25 toward the front, carrying with it the ball valve. As long as this sleeve rests against the end of the cylinder this ball valve will be held open, thereby letting the oil pass around the valve, cylinder and back through the by-pass or return pipe 39 where it can again be carried through the pump and cause a general circulation.

When it is desired to lower the dump body the valve is shifted so that instead of the oil being pumped from the pump into the cylinder it is by-passed and circulates around 32, 33 and passageway 38, back into the passageway 40 to the pump. By this means there is a recirculation of the oil without its circulating through the cylinder. During the time that the oil is recirculating through the cylinder the body is held in dumping position. When the valve is shifted so that the body may be lowered to a horizontal load-sustaining position the oil passes from the front of the cylinder 9, through the passageway 39 to the passageway 40 at the rear end of the cylinder, and back to the pump. When it is no longer desired to apply pressure the power take-off gear mechanism that operates the pump may be thrown out of mesh so that the pump does not operate. In order to dump the body a second time the same operation is performed.

I desire to comprehend within my invention such modifications as may be embraced within my claims and the scope of my invention.

Having thus fully described my invention, what I claim as new and desire to secure by Letters Patent, is:

1. In a dump truck, a frame, a body pivoted to the frame, a cylinder attached to the frame, a piston and piston rod in the cylinder operatively connected to the body for dumping it, means to admit a fluid under pressure to one end of the cylinder on one side of the piston, said piston and piston rod having a passageway therethrough, a pipe without the cylinder connecting the other end of said cylinder to said means, means cooperating with the fluid under pressure to close said passageway, and a ring on the piston rod operated by the cylinder to open said passageway, whereby the fluid is by-passed through said pipe and the piston is held in one position.

2. In a dump truck, a body pivotally supported for dumping purposes, a cylinder, longitudinally movable means in the cylinder for dumping said body, means on one end of the cylinder for applying power fluid to the longitudinally movable means to move it, a pipe without the cylinder connecting the other end of the cylinder to said means on one end of said cylinder, and a ring on the longitudinally movable means to modify the effect of the power fluid on the longitudinally movable means without modifying the power fluid by opening a passageway through the longitudinally movable means and thereby by-passing the power fluid through said pipe.

3. In a dump truck, a body pivotally supported for dumping purposes, a cylinder, means movable in the cylinder in a plane to cause the body to dump, means on one end of the cylinder to apply power fluid to said movable means, a pipe without the cylinder connecting the other end of the cylinder to said means on one end of said cylinder, and a ring on the movable means operable at a certain point in its movement to modify the effect of the power fluid on the movable means without modifying the power fluid by opening a passageway through the movable means and thereby by-passing the power fluid through said pipe.

4. In a motor-driven truck, a frame, a body pivotally supported on the frame for dumping purposes, a cylinder, longitudinally movable means in the cylinder to cause the body to dump, means on one end of the cylinder to cause the body to dump, means on one end of the cylinder operated by the truck motor to apply power fluid to the longitudinally movable means to move it, a pipe without the cylinder connecting the other end of the cylinder to said means on one end of said cylinder, and a ring on said longitudinally movable means to modify the effect of the power fluid on the longitudinally movable means by opening a passageway through the longitudinally movable means and thereby by-passing the power fluid through said pipe.

5. In a dump truck, a frame, a relatively-deep sub-frame associated therewith, a dump body pivotally mounted on said sub-frame with the pivots located at the base thereof, an upwardly-inclined hoist cylinder mounted on said sub-frame and substantially within the confines thereof, a piston and piston rod movable within said cylinder, a crosshead on said piston rod, guide members arranged adjacent to said crosshead and adapted to guide it in an upwardly-inclined direction, and link members pivotally attached to said crosshead at one end and to said body at the other end whereby to provide an increased torque for tilting said dump body.

6. In a dump truck, a frame, a relatively-deep sub-frame associated therewith, a dump body pivotally mounted on said sub-frame with the pivots located at the base thereof, an upwardly-inclined hoist cylinder mounted on said sub-frame and substantially within the confines thereof, a piston and piston rod movable within said cylinder, a crosshead on said piston rod, guide members arranged adjacent to said crosshead and adapted to guide it in an upwardly-inclined direction, and link members pivotally attached to said crosshead at one end and to said body at the other end whereby to provide an increased torque for tilting said dump body, the pivotal connection between said body and said sub-frame comprising downwardly-extending brackets secured to said body and having pivot-bearing means at their lower ends and below the line of application of the thrust from said piston rod.

RALPH E. SMITH.